US011296844B2

(12) United States Patent
Axelsson et al.

(10) Patent No.: US 11,296,844 B2
(45) Date of Patent: Apr. 5, 2022

(54) ALLOCATION OF REFERENCE SIGNALS

(71) Applicant: Telefonaktiebolaget LM Ericsson (publ), Stockholm (SE)

(72) Inventors: Håkan Axelsson, Linköping (SE); Mehdi Amirijoo, Linköping (SE); Stefan Engström, Linköping (SE); Paul Stjernholm, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 82 days.

(21) Appl. No.: 16/310,196

(22) PCT Filed: Jun. 17, 2016

(86) PCT No.: PCT/EP2016/064032
§ 371 (c)(1),
(2) Date: Dec. 14, 2018

(87) PCT Pub. No.: WO2017/215763
PCT Pub. Date: Dec. 21, 2017

(65) Prior Publication Data
US 2019/0334673 A1    Oct. 31, 2019

(51) Int. Cl.
*H04L 5/00* (2006.01)
*H04W 24/08* (2009.01)
*H04W 24/10* (2009.01)

(52) U.S. Cl.
CPC .......... *H04L 5/0048* (2013.01); *H04W 24/08* (2013.01); *H04W 24/10* (2013.01); *H04L 5/0007* (2013.01)

(58) Field of Classification Search
CPC ..... H04B 7/0421; H04L 5/0007; H04L 5/001; H04L 5/0023; H04L 5/003; H04L 5/0048;
(Continued)

(56) References Cited

U.S. PATENT DOCUMENTS 9,059,824 B2 * 6/2015 Onggosanusi ........ H04L 5/0048
2010/0103875 A1 * 4/2010 Simonsson ........... H04W 76/12
370/328
(Continued)

FOREIGN PATENT DOCUMENTS

CN    103220066 A    7/2013
CN    103814544 A    5/2014
(Continued)

OTHER PUBLICATIONS

Unknown, Author, "3rd Generation Partnership Project; Technical Specification Group Radio Access Network; Evolved Universal Terrestrial Radio Access (E-UTRA); Physical channels and modulation (Release 13)", 3GPP TS 36.211 V13.1.0, Mar. 2016, 155 pages.

*Primary Examiner* — Minh Trang T Nguyen
(74) *Attorney, Agent, or Firm* — Murphy, Bilak & Homiller, PLLC

(57) ABSTRACT

A method of allocating reference signals for determining radio link quality, in a source node, the method triggering or comprising the steps of: Transmitting to a candidate node information about at least one reference signal allocated for transmission in at least one beam controlled by the source node and/or information about one or more reference signals eligible to be allocated for a transmission in at least one beam controlled by the candidate node.

7 Claims, 8 Drawing Sheets

(58) Field of Classification Search
CPC ... H04L 5/0051; H04L 5/0053; H04L 5/0057; H04W 24/08; H04W 24/10
See application file for complete search history.

(56) References Cited

U.S. PATENT DOCUMENTS

| | | | |
|---|---|---|---|
| 2013/0194950 A1* | 8/2013 | Haghighat | H04L 5/0073 370/252 |
| 2013/0208698 A1* | 8/2013 | Taori | H04W 36/04 370/331 |
| 2015/0200718 A1* | 7/2015 | Sajadieh | H04L 65/608 375/267 |
| 2015/0215014 A1* | 7/2015 | Zhu | H04B 7/0469 375/267 |
| 2016/0036571 A1 | 2/2016 | Park et al. | |
| 2016/0043843 A1 | 2/2016 | Liu et al. | |
| 2016/0149679 A1* | 5/2016 | Frenne et al. | |
| 2017/0006613 A1* | 1/2017 | Kakishima | H04B 7/024 |
| 2017/0289733 A1* | 10/2017 | Rajagopal | H04W 4/70 |
| 2017/0311252 A1* | 10/2017 | Takano | H04W 48/20 |
| 2018/0115357 A1* | 4/2018 | Park | H04B 7/04 |
| 2018/0176942 A1* | 6/2018 | Kim | H04W 72/04 |

FOREIGN PATENT DOCUMENTS

| | | | |
|---|---|---|---|
| CN | 104620551 | A | 5/2015 |
| CN | 105229932 | A | 1/2016 |
| CN | 105471568 | A | 4/2016 |
| EP | 2797353 | A1 | 10/2014 |
| WO | 2010024743 | A1 | 3/2010 |

\* cited by examiner

ALLOCATION OF REFERENCE SIGNALS

TECHNICAL FIELD

The present invention relates to the field of wireless communication and in particular to methods of allocating reference signals, as well as network nodes such as a source node and a candidate node and the use of said method of allocating reference signals. Corresponding computer programs are also disclosed herein.

BACKGROUND

In a typical wireless system, also referred to as a wireless communications network, one or more wireless communication devices, also known as mobile stations and/or User Equipment units (UEs) communicate via at least one Radio Access Network (RAN) to a Core Network (CN). The wireless communication devices may be mobile stations or user equipments such as mobile telephones also known as cellular telephones, and laptops with wireless capability, e.g., mobile termination, and thus may be, for example, portable, pocket, hand-held, computer-included, or car-mounted mobile devices which communicate voice and/or data with radio access network. The radio access network covers a geographical area which is divided into cell areas, with each cell area being served by a radio network node, such as a base station, which in some radio access networks is also called eNodeB (eNB), NodeB, or base station. A cell is a geographical area where radio coverage is provided by the radio base station at a base station site.

The use of multiple antennas plays an important role in modern wireless communication systems, such as 3rd Generation (3G) LTE (Long Term Evolution) systems, to achieve improved system performance, including capacity and coverage, and service provisioning. Acquisition of channel state information (CSI) at the transmitter or the receiver is important to proper implementation of multi-antenna techniques. In general, channel characteristics, such as the impulse response, are estimated by sending and receiving one or more predefined training sequences, which can also be called Reference Signals (RS). To estimate the channel characteristics of a downlink for example, a base station transmits reference signals to wireless communication devices, which use the received versions of the known reference signals to estimate the DL channel, e.g. to provide an estimated channel matrix. The wireless communication devices can then use the estimated channel matrix for coherent demodulation of the received DL signal, and obtain potential beam-forming gain, spatial diversity gain, and spatial multiplexing gain available with multiple antennas. In addition, the reference signals may be used to do channel quality measurement to support link adaptation.

Beam-forming is a signal processing technique used to control the directionality of the reception or transmission of a signal. Spatial diversity refers to using two or more antennas to improve the quality and reliability of a wireless link. Using multiple antennas offers a receiver several observations of the same signal.

Transmissions in a network using Orthogonal frequency-division multiplexing (OFDM) may be seen as a grid in time and frequency as e.g. depicted in FIG. 1. A scheduler in a base station may allocate a specific number of subcarriers during a specific time to one wireless communication device. To simplify the system, too small units cannot be allocated to one wireless communication device, and the smallest unit within OFDM resource grid is referred to as a resource element, and that is one OFDM symbol transferred on one carrier. In the case of OFDM transmission a straightforward design of a reference signal is to transmit known reference symbols in an OFDM frequency-vs.-time grid. Today cell-specific Reference Signals (CRS) and symbols are used which are described in sections 6.10 and 6.11 of 3GPP TS 36.211 (13.1.0). Among the aforementioned reference signals, only CRS have to be transmitted in every downlink subframe, and the other reference signals are transmitted at specific occasions configured by the network.

The CRS are used by a wireless communication device to measure radio quality on candidate cells in order to provide cell reselection in idle mode and to provide measurement reports to the network in connected mode.

SUMMARY

With the emergence of next generation wireless communication systems, such as 5G, and also within the present wireless communication systems a lean realization of a reference signal transmission in envisaged. For example it may be presupposed that reference symbols may not be consistently broadcasted from the network. Therefore the reference signals may only be activated when needed, e.g. when a when a wireless communication device is in need of network support such as mobility actions.

In order to avoid a conflict of reference signals, the reference signal(s) used should preferably be unique for each neighbor area and/or neighboring transmission point from which the wireless communication device can receive said reference signals (during a measurement period). If the reference signals are not unique a conflict may arise which as may be the case has to be handled. Thus, there is a need to minimize the probability of a reference signal conflict and/or in case that a conflict occurs to handle the conflict.

According to a first aspect a method of allocating reference signals for determining radio link quality, in a source node, is proposed. The method triggering or comprising the steps of: Transmitting to a candidate node information about at least one reference signal allocated for transmission in at least one beam controlled by the source node. Alternatively or additionally, the method triggers or comprises the step of: Transmitting to a candidate node information about one or more reference signals eligible to be allocated for a transmission in at least one beam controlled by the candidate node.

According to a second aspect a method of allocating reference signals for determining radio link quality, in a candidate node, is proposed. The method triggering or comprising the steps of: Receiving from a source node information about at least one reference signal allocated for transmission in at least one beam controlled by the source node. Alternatively or additionally, the method triggering or comprising the steps of: Receiving from a source node information about one or more reference signals eligible to be allocated for a transmission in at least one beam controlled by the candidate node.

According to a third aspect a method of allocating reference signals for determining radio link quality, in a wireless communication system comprising a source node and a candidate node, is proposed. The method triggering or comprising the step of: Transmitting from the source node information about at least one reference signal allocated for transmission in at least one beam controlled by the source node and/or information about one or more reference signals eligible to be allocated for a transmission in at least one beam controlled by the candidate node. The method further comprising the step of: Receiving by the candidate node said information about at least one reference signal allocated for transmission in at least one beam controlled by the source node and/or said information about one or more reference signals eligible to be allocated for a transmission in at least one beam controlled by the candidate node.

According to a fourth aspect use of the method according to any one of the preceding aspects for performing a hand-over of a wireless communication device from the source node to the candidate node is proposed.

According to a fifth aspect use of the method according to any one of the preceding aspects for selecting, aggregating and/or adding a component carrier is proposed.

According to a sixth aspect a method according to any one of the preceding aspects for balancing traffic load between at least two component carriers is proposed.

According to a seventh aspect a source node for allocating reference signals for determining radio link quality is proposed. The source node operative to transmit to a candidate node information about at least one reference signal allocated for transmission in at least one beam controlled by the source node and/or operative to transmit to a candidate node information about one or more reference signals eligible to be allocated for a transmission in at least one beam controlled by the candidate node.

According to an eight aspect a candidate node for allocating reference signals for determining radio link quality is proposed. The candidate node operative to receive from a source node information about at least one reference signal allocated for transmission in at least one beam controlled by the source node and/or information about one or more reference signals eligible to be allocated for a transmission in at least one beam controlled by the candidate node.

According to a ninth aspect a wireless communication system for allocating reference signals for determining radio link quality comprising a source node and a candidate node is proposed, wherein the source node is operative to transmit to a candidate node information about at least one reference signal allocated for transmission in at least one beam controlled by the source node and/or information about one or more reference signals eligible to be allocated for a transmission in at least one beam controlled by the candidate node, and wherein the candidate node operative to receive from a source node information about at least one reference signal allocated for transmission in at least one beam controlled by the source node and/or information about one or more reference signals eligible to be allocated for a transmission in at least one beam controlled by the candidate node.

According to a tenth aspect a computer program product comprising program code to be executed by a processor of a source node is proposed, thereby configuring the source node to operate in accordance with a method as defined by the first aspect.

According to an eleventh aspect a computer program product comprising program code to be executed by a processor of a candidate node first radio device is proposed, thereby configuring the candidate node to operate in accordance with a method as defined by the second aspect.

Of course, the present invention is not limited to the above features and advantages. Indeed, additional features and advantages are presented in the following detailed description, and in the accompanying drawings.

BRIEF DESCRIPTION OF THE DRAWINGS

Aspects of the present disclosure are illustrated by way of example and are not limited by the accompanying figures with references indicating like elements.

DETAILED DESCRIPTION

Figure 1:
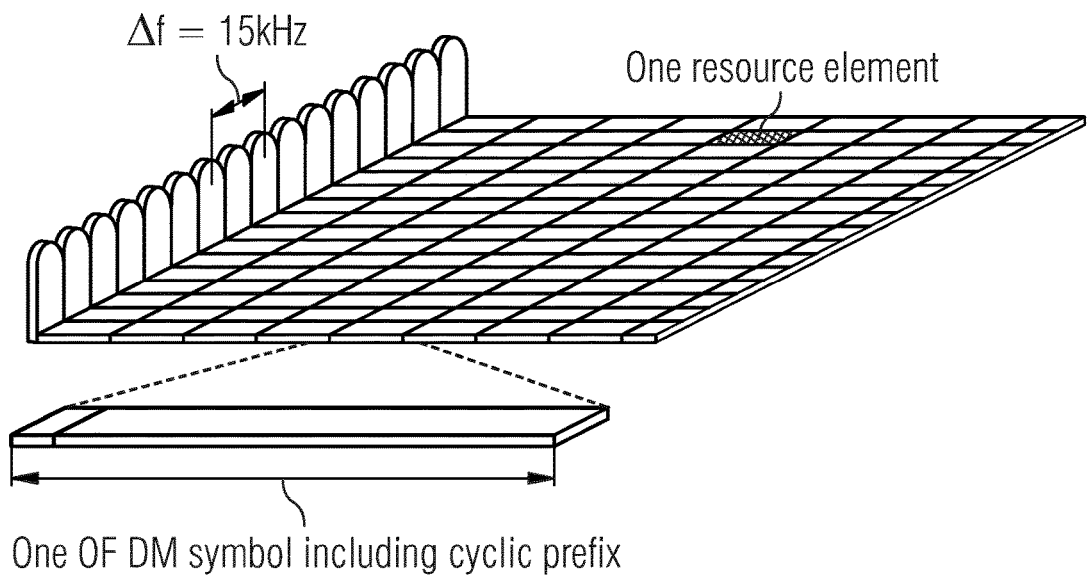
FIG. 1 shows an exemplary embodiment of a time-frequency grid.

A wireless communication system such as a cellular network may comprise a core network (not shown) and one or more network nodes of a radio access network, for example in the form of evolved Node Bs, also known as eNode Bs or eNBs. The radio access network nodes could also be in the form of Node Bs, BTSs (Base Transceiver Stations), BS (Base Station) and/or BSSs (Base Station Subsystems), etc. The radio access network nodes provide radio connectivity to one or more wireless communication devices. The term wireless communication device may comprise user equipment as e.g. any kind of mobile communication terminal, wireless terminal, mobile terminal, user terminal, user agent, machine-to-machine devices etc., and can be, for example, what today is commonly known as a mobile phone or a tablet/laptop with wireless connectivity or fixed mounted terminal. Moreover, a wireless communication device may, but does not need to, be associated with a particular end user.

The wireless communication system may e.g. comply with any one or a combination of LTE (Long Term Evolution), LTE-SAE (Long Term Evolution-System Architecture Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable. Uplink (UL) communication (from the wireless communication device to the network) and downlink (DL) communication (from the network to the wireless communication device) between each wireless communication device and at least one the network nodes occur over a wireless radio interface. The quality of the wireless radio link to each wireless communication device can vary over time and depending on the position of the wireless communication device, due to effects such as fading, multipath propagation, etc.

A network node may be equipped with a radio interface for communication with one or more wireless communication devices. In such a case the network node may be referred to as radio access (network) node. However, network nodes may exist that do not possess such as radio interface and may be referred to access node or network node in general. An access node may however be operatively coupled to a radio interface e.g. via a radio access (network) node. Both, the radio access node and the access node may form part of a radio access network which itself may be connected to the core network—such radio access network is inter alia depicted in FIG. 9 (comprising radio access nodes RAN1, RAN2, RAN3 and access nodes AN1, AN2). It is to be understood that the source node(s) and/or the candidate node(s) can be any one of the mentioned nodes of the network nodes.

The network nodes may thus be connected to the core network for connectivity to central functions and external networks, such as the Internet or other operators. In order to fully describe a way of implementing embodiments, the embodiments presented herein may be described using terminology and signaling used in LTE. However, it is to be noted that the embodiments are not restricted thereto and maybe applied to any suitable current or future standards.

LTE uses OFDM in the downlink and DFT-spread OFDM (also referred to as single-carrier FDMA) in the uplink. The basic LTE downlink physical resource can thus be seen as a time-frequency grid as illustrated in FIG. 1 where each resource element corresponds to one OFDM subcarrier during one OFDM symbol interval. The uplink subframe has the same subcarrier spacing as the downlink and the same number of SC-FDMA symbols in the time domain as OFDM symbols in the downlink.

Figure 2:
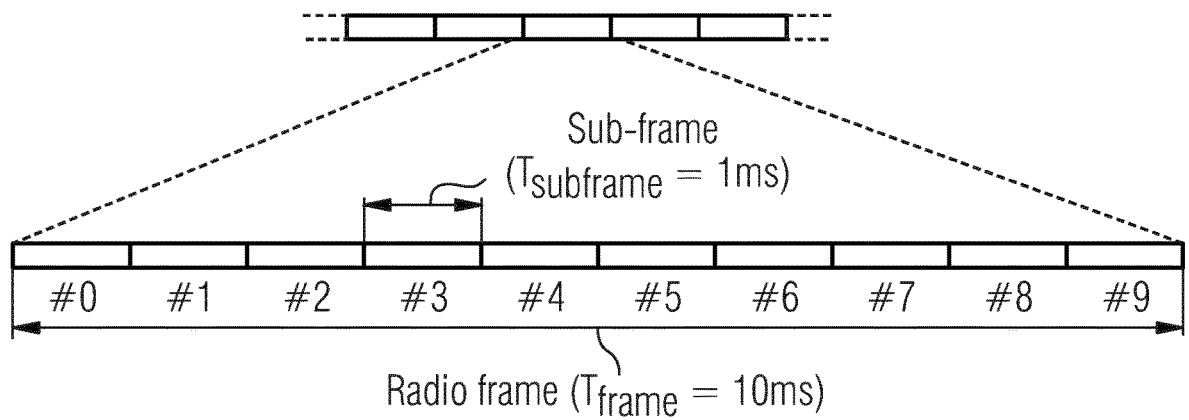
FIG. 2 shows an exemplary embodiment of a time-domain structure.

In the time domain, LTE downlink transmissions are organized into radio frames of $T_{frame}=10$ ms, each radio frame consisting of ten equally-sized subframes of length $T_{subframe}=1$ ms as shown in FIG. 2. Each subframe comprises two slots of duration 0.5 ms each, and the slot numbering within a radio frame ranges from 0 to 19. For normal cyclic prefix, one subframe consists of 14 OFDM symbols. The duration of each symbol is approximately 71.4 µs.

Furthermore, the resource allocation in LTE is typically described in terms of resource blocks, where a resource block corresponds to one slot (0.5 ms) in the time domain and 12 contiguous subcarriers in the frequency domain. A pair of two adjacent resource blocks in time direction (1.0 ms) is known as a resource block pair. Resource blocks are numbered in the frequency domain, starting with 0 from one end of the system bandwidth.

Figure 3:
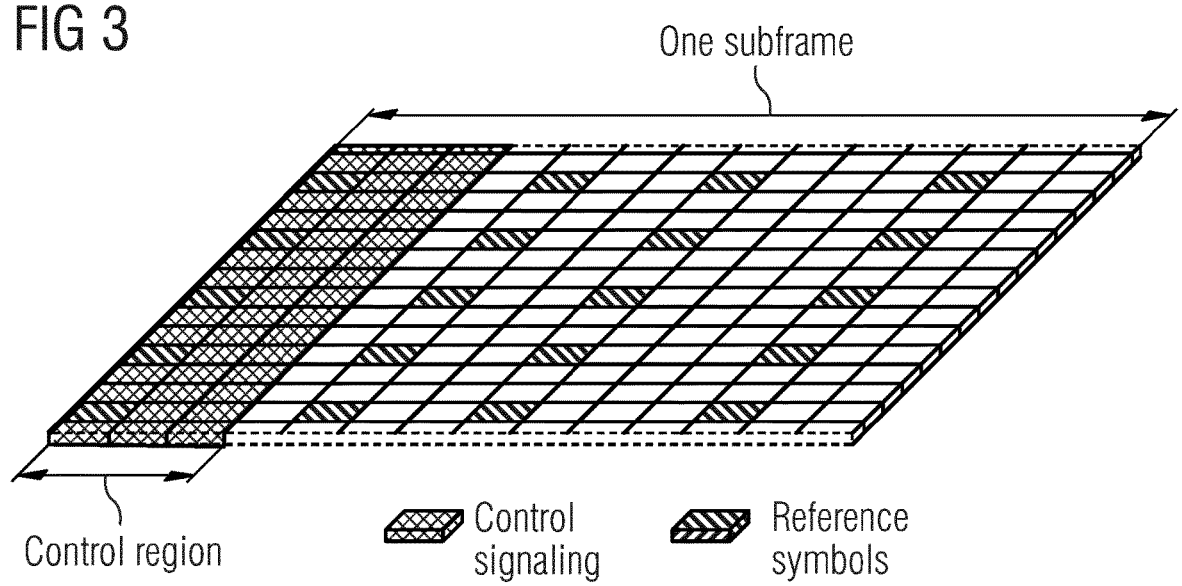
FIG. 3 shows an exemplary embodiment of a downlink subframe.

Downlink transmissions are dynamically scheduled, i.e., in each subframe an access node may transmit control information about which wireless communication device data is transmitted to and upon which resource blocks the data is transmitted, in the current downlink subframe. This control signaling is typically transmitted in the first 1, 2, 3 or 4 OFDM symbols in each subframe and the number n=1, 2, 3 or 4 is known as the Control Format Indicator (CFI). The downlink subframe also contains common reference symbols, which are known to the receiver and used for coherent demodulation of e.g. the control information. A downlink system with CFI=3 OFDM symbols as control is illustrated in FIG. 3. The reference symbols shown in FIG. 3 are the cell specific reference symbols (CRS) and are used to support multiple functions including (fine) time and/or frequency synchronization and/or channel estimation. In general a reference signal may comprise one or more (known) reference symbols. These, one or more reference symbols may be inserted in one or more OFDM symbols of a subframe. Also, the reference symbol position (on the time/frequency grid) may vary between different cells, especially if the cells are controlled by different access nodes.

Figure 4:
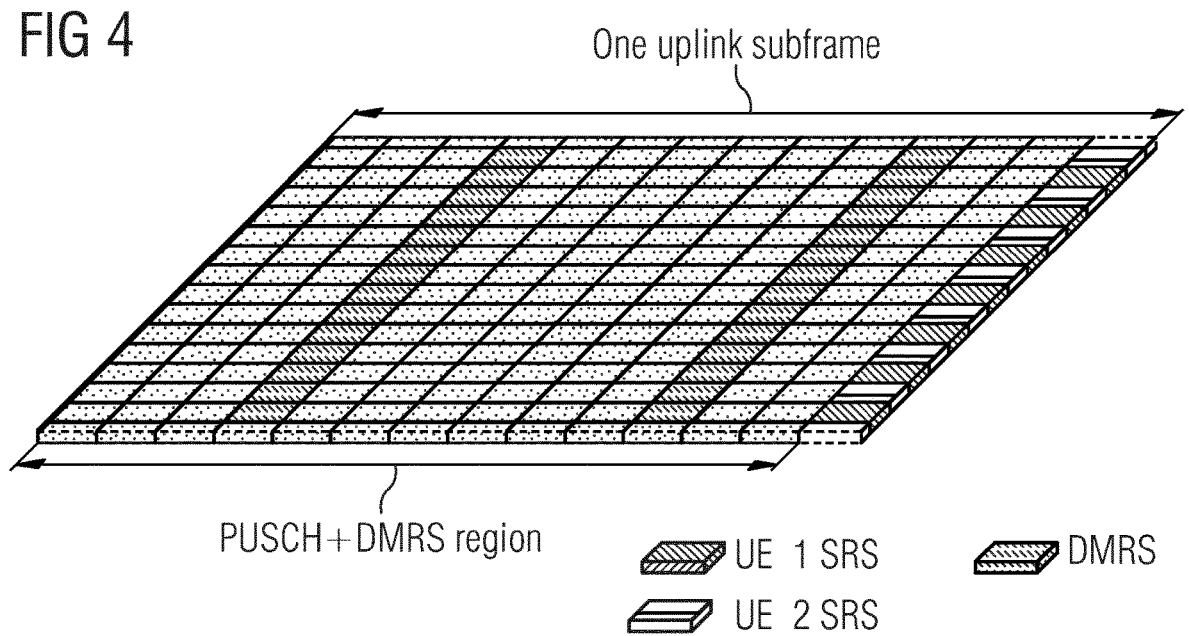
FIG. 4 shows an exemplary embodiment of an uplink subframe.

Uplink transmissions are dynamically scheduled, i.e., in each downlink subframe the access node transmits control information about which wireless communication devices should transmit data to the access node in subsequent subframes, and upon which resource blocks the data is transmitted. The uplink resource grid is comprised of data and uplink control information in the PUSCH, uplink control information in the PUCCH, and various reference signals such as demodulation reference signals (DMRS) and sounding reference signals (SRS). DMRS are used for coherent demodulation of PUSCH and PUCCH data, whereas SRS is not associated with any data or control information but is generally used to estimate the uplink channel quality for purposes of frequency-selective scheduling. An example uplink subframe is shown in FIG. 4. The UL DMRS and SRS are time-multiplexed into the UL subframe, and SRS are always transmitted in the last symbol of a normal UL subframe. The PUSCH DMRS is transmitted once every slot for subframes with normal cyclic prefix, and is located in the fourth and eleventh SC-FDMA symbols.

From LTE Rel-11 onwards, DL or UL resource assignments can also be scheduled on the enhanced Physical Downlink Control Channel (EPDCCH). For Rel-8 to Rel-10 only the Physical Downlink Control Channel (PDCCH) is available. Resource grants are wireless communication device specific and are indicated by scrambling the DCI Cyclic Redundancy Check (CRC) with the UE-specific C-RNTI identifier. A unique C-RNTI is assigned by a cell to every wireless communication device associated with it, and can take values in the range 0001-FFF3 in hexadecimal format. A wireless communication device uses the same C-RNTI on all serving cells.

In cellular networks, such as Long Term Evolution (LTE), a concept of carrier aggregation (CA) is being deployed. CA implies that several (two or more) Component Carriers (CC) can be utilised for communication between a network node and a wireless communication device. The CCs can be contiguous in the frequency domain or non-contiguous.

Figure 5:
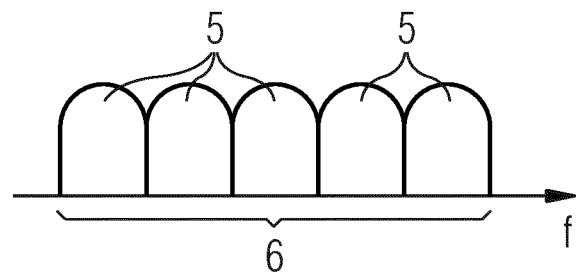
FIG. 5 shows an exemplary embodiment of carrier aggregation.

FIG. 5 is a schematic diagram illustrating carrier aggregation in a wireless communication system. Here five contiguous component carriers (CC) 5 are combined in an aggregated bandwidth 6. Carrier Aggregation (CA) implies that an LTE Rel-10 wireless communication device can receive multiple CC, where the CC have, or at least the possibility to have, the same structure as a Rel-8 carrier. The same structure as Rel-8 implies that all Rel-8 signals, e.g. (primary and secondary) synchronization signals, reference signals, system information are transmitted on each carrier.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell area may be different from the number of CCs seen by a wireless communication device: A wireless communication device may for example support more downlink CCs than uplink CCs, even though the network offers the same number of uplink and downlink CCs.

Upon successful connection to the network a wireless communication device may—depending on its own capabilities and the network—be configured with additional CCs in the UL and DL. Configuration may be based on RRC (Radio Resource Control).

Activation of CC therefore provides the possibility to configure multiple CCs but only activate them on a need basis. Most of the time a wireless communication device would have one or very few CCs activated resulting in a lower reception bandwidth and thus lower battery consumption.

The CCs belonging to the CA may belong to the same frequency band (aka intra-band CA) or to different frequency band (inter-band CA) or any combination thereof (e.g. 2 CCs in band A and 1 CC in band B). The carriers in intra-band CA can be adjacent (aka contiguous) or non-adjacent (aka noncontiguous). In non-adjacent intra-band CA (aka non-contiguous CA), the carriers in gaps may be used by other operators. Typically in intra-band CA the wireless communication device may require single radio frequency (RF) receiver chain and RF transmitter chain for receiving and transmitting the aggregated carriers respectively especially when the total aggregated carriers are within certain limit e.g. 20 MHz in total for HSPA or 40 MHz in total for LTE. Otherwise the wireless communication device may have to implement more than one RF transmitter/receiver chains for aggregated larger number of carriers and particularly in case of non-contiguous CA. The inter-band CA comprises carriers distributed over two bands. Furthermore the CCs in intra-band CA may be adjacent or non-adjacent in frequency domain (aka intra-band non-adjacent CA). A hybrid CA comprising intra-band adjacent, intra-band non-adjacent and inter-band is also possible.

Using carrier aggregation between carriers of different technologies is also referred to as "multi-RAT carrier aggregation" (RAT corresponds to Radio Access Technology) or "multi-RAT-multi-carrier system" or simply "inter-RAT carrier aggregation". For example, the carriers from W-CDMA and LTE maybe aggregated. Another example is the aggregation of LTE and CDMA2000 carriers. For the sake of clarity the carrier aggregation within the same technology may be regarded as 'intra-RAT' or simply 'single RAT' carrier aggregation. In inter-RAT CA, one of the systems may be configured as the primary system and another one or the remaining ones as the secondary system or auxiliary system. The primary system may carry basic signaling and configuration information between the network and the wireless communication device. It should also be noted that the CCs in CA may or may not be co-located in the same site or network node. For instance the CCs may originate (i.e. transmitted/received) at different locations (e.g. from non-located BS (Base Station) or from BS and RRH (Remote Radio Head) or RRU (Remote Radio Unit)). The well known examples of combined CA and multi-point communication are heterogeneous network, multi-tier/multi-layered system (e.g. mixed of low and high power nodes such as pico and macro BS, DAS (Distributed Antenna System), RRH, RRU, CoMP (Co-ordinated Multi-Point), multi-point transmission/reception, joint processing (JP) etc. The embodiments presented herein also apply to the multi-point carrier aggregation systems.

It should be noted that the embodiments presented herein are not restricted to the particular terminology used here. It should be noted that also during the carrier aggregation work for LTE, various terms have been used to describe for example Component Carriers, or CCs in short. The embodiments presented herein are therefore applicable e.g. to situations where terms like multi-cell or dual-cell operation is described, e.g. with a Primary (Serving) Cell PCell and potentially multiple Secondary (Serving Cells) SCell, or alike.

Scheduling of a CC is done on the PDCCH via downlink assignments. Control information on the PDCCH is formatted as a Downlink Control Information (DCI) message.

Furthermore, the use of beamforming is known in order to e.g. concentrate the energy and to compensate for the loss of link budget in the high frequency spectrum. In addition to the usage of beamforming, reducing energy consumption in radio networks is an overall design criterion for 5G systems.

Figure 6A:
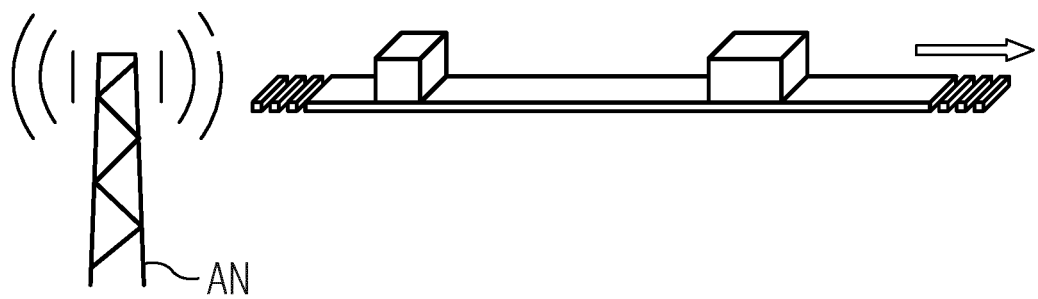
FIGS. 6a and 6b illustrates an embodiment of ultra-lean design of reference signal transmission.
Figure 6B:
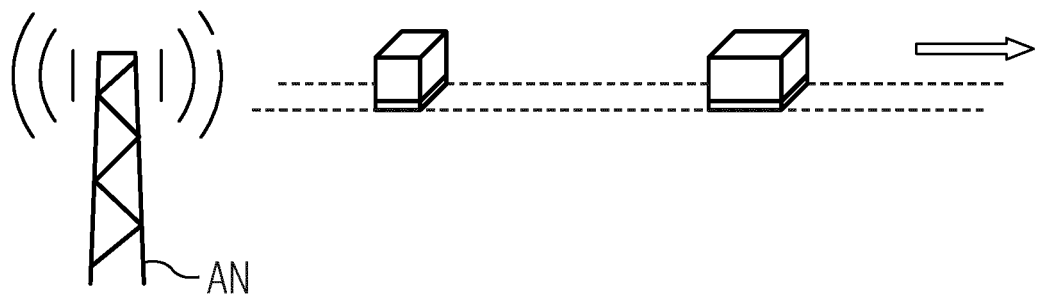

Now, when, for example, considering the new 5G system, the usage of beamforming and the aimed minimization of always-on transmissions will lead to new problems especially in the case the wireless communication device needs to rely on common signals typically always on (contradicting the energy efficiency requirements) and broadcasted (challenging to be realized in a beamforming-based system). The evolvement in transmission of reference signals today to not "always on" reference signals in an ultra-lean system as well as minimization of broadcasted system information is outlined in FIGS. 6a and 6b. This ultra-lean design drives the minimization of always-on signals. The "always on" reference signals are depicted as a continuous band and the data transmission, e.g. user and/or control data, is depicted as one or more blocks on top of the continuous band in FIG. 6a. In FIG. 6b the dashed lines depict the absence of transmission of reference signals and/or broadcast information. Reference signals and/or broadcast information may in such a case only be transmitted when data transmission occurs as illustrated in FIG. 6b.

In particular, a design goal in this area is the minimization of the amount of "always-on" signals, such as synchronization signals, e.g. the primary synchronization signal (PSS) and the secondary synchronization signal (SSS), the cell-specific reference signals (C-RS) and the broadcasted system information. In general, it is proposed to minimize the amount of information over the air interface not directly associated with the transmission of data. This requirement may lead to challenges associated with system access, specifically for 5G, because these "always-on" signals are so called common signals/channels used for system access procedures. For example, in LTE a UE (User Equipment) needs to detect PSS/SSS in order to camp on a cell and get time and frequency synchronization before it can receive C-RSs, perform channel estimation and read system information.

Figure 7:
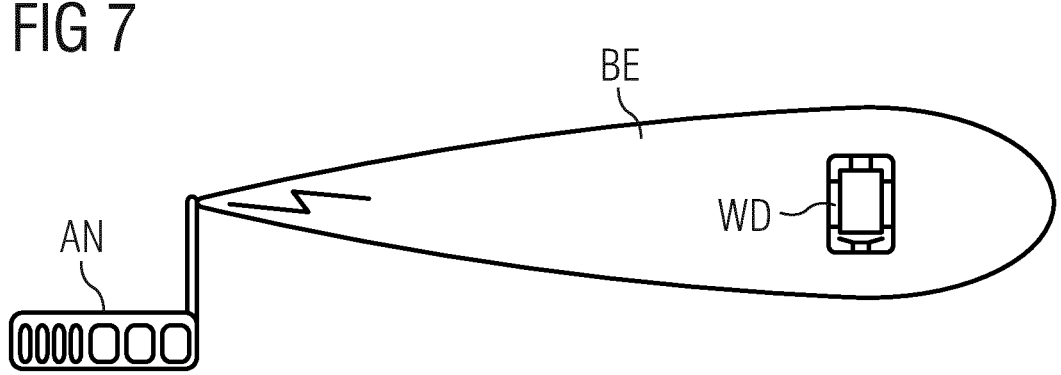
FIG. 7 illustrates a (single) beam for supporting a wireless communication device.

If in addition to the lean design principle addressed-above beamforming is also desired so that additional challenges may exist. As beamforming is used to concentrate the energy to enable and/or improve communication between an access node AN and a wireless communication device WD, as depicted in FIG. 7, a beam BE preferably has to be targeting a single wireless communication device at a time. Such wireless communication device specific beams are preferably activated on a per-need basis (according to the lean design principle), but a possible alternative may be to have a set of fixed beams more or less always active. The wireless communication device specific beams rely on frequent feedback from the wireless communication device to support the adaptation or replacement of the beam to follow the wireless communication device's movements. Such frequent feedback counteracts the purpose of the energy saving state to save energy and battery charge in the wireless communication device.

To achieve that goal and at the same time enable that the wireless communication device can still be reached by the network, the wireless communication device can move around within a defined coverage area, e.g. a multi-cell area defined by a tracking area list in LTE, without informing the network of its whereabouts. The wireless communication device still needs to listen for transmissions from the network in this state, in order to measure the signal quality, perform cell re-selection, when needed, read system information, monitor paging channels and send location area updates so that it can be reached by the network. The network provides the signals for the wireless communication device to measure on (as well as the system information) through continuously and often frequently repeated broadcasted transmissions. In the case of LTE, the energy saving state optimized for wireless communication device battery savings is the RRC_IDLE/ECM_IDLE state. In that state the wireless communication device basically listens to PSSs/SSSs that encode the physical cell identity (PCI), enabling the wireless communication device to detect the cell, perform cell reselection (without the need to report to the network) and read the system information to detect whether tracking area updates are needed. Based on the PCI the wireless communication device can derive the cell-specific reference signals (C-RS) and perform channel estimation in order to decode the system information.

In addition, maintaining such beams for a significant number of wireless communication devices is demanding for the network and may consume a significant amount of its capacity, especially in the case of systems with limited beamforming capability, such as systems using analog beamforming. On the other hand, continuous frequently repeated transmissions to support wireless communication devices in the manner of legacy systems counteract the requirement, e.g. in 5G networks, to be energy efficient.

It is thus desirable to provide methods, an access node, wireless communication device, a system and a computer program to enhance resource and energy efficiency in a network and particularly in a wireless communication device.

There are several reasons which could lead to activation of the beam BE as shown in FIG. 7 and/or the activation of reference signal transmission within the beam BE.

The reference signal, RS, transmitted in the beam BE as for example downlink information, can be any signal supporting an wireless communication device WD, in different functions, such as mobility control, provision of channel information or/and synchronization information. Thus, there are different types of RSs, such as Mobility Reference Signals (MRS) or Time Synchronization Signals (TSS), e.g. SSS and PSS. Another type of RS is the cell-specific reference signal (C-RS). Accordingly, the reference signal of these embodiments, also abbreviated as RS, should be understood as a wireless communication device support signal. The same RS can be repeatedly or even periodically transmitted in the beam BE. Furthermore, UE-specific reference signals may be transmitted within resource blocks used for beam-formed transmission.

Also, multiple beams serving multiple wireless communication devices such as UEs may be controlled by one or more access nodes.

A beam can be interpreted in a general sense, where a beam also may be omnidirectional, which essentially means that no beamforming is applied. Nevertheless, it has been discussed that in some systems, e.g. 5G systems, beamforming may be advantageous, in particular in systems which are expected to rely a lot on beamforming to achieve good channel quality (and thus enable high data rates) in reasonably large coverage areas. For example, poor propagation properties for higher frequencies that are expected to be used for 5G systems may occur. In addition, the benefits of some embodiments may be more pronounced in a beam-based system.

Thus, the wireless communication system is preferably a beam-based wireless communication system supporting an omnidirectional beam and/or one or more directional beams, e.g. via one or more access nodes. Nevertheless, the presented methods apply to any beam form including omnidirectional beam, directional beam or any type of sector transmission which are well known in antenna design in telecommunications.

It should be understood as well that the carrier aggregation may be employed at the same time as beamforming. For example, a first and a second carrier may be used by the same beam or by different beams. The same is true with respect to one or more access nodes. That is, a first carrier and a second carrier may be used by the same access node or by different access nodes. Thus an embodiment may be that a first carrier of a first beam controlled by a first access node is employed together with a second carrier of a second beam controlled by a second access node. This mode of operation may be applied for mobility action as e.g. handover from a first to a second access node, for carrier aggregation, for load balancing or traffic balancing or for other application mentioned herein such as selecting, aggregating and or adding a component carrier.

Figure 8:
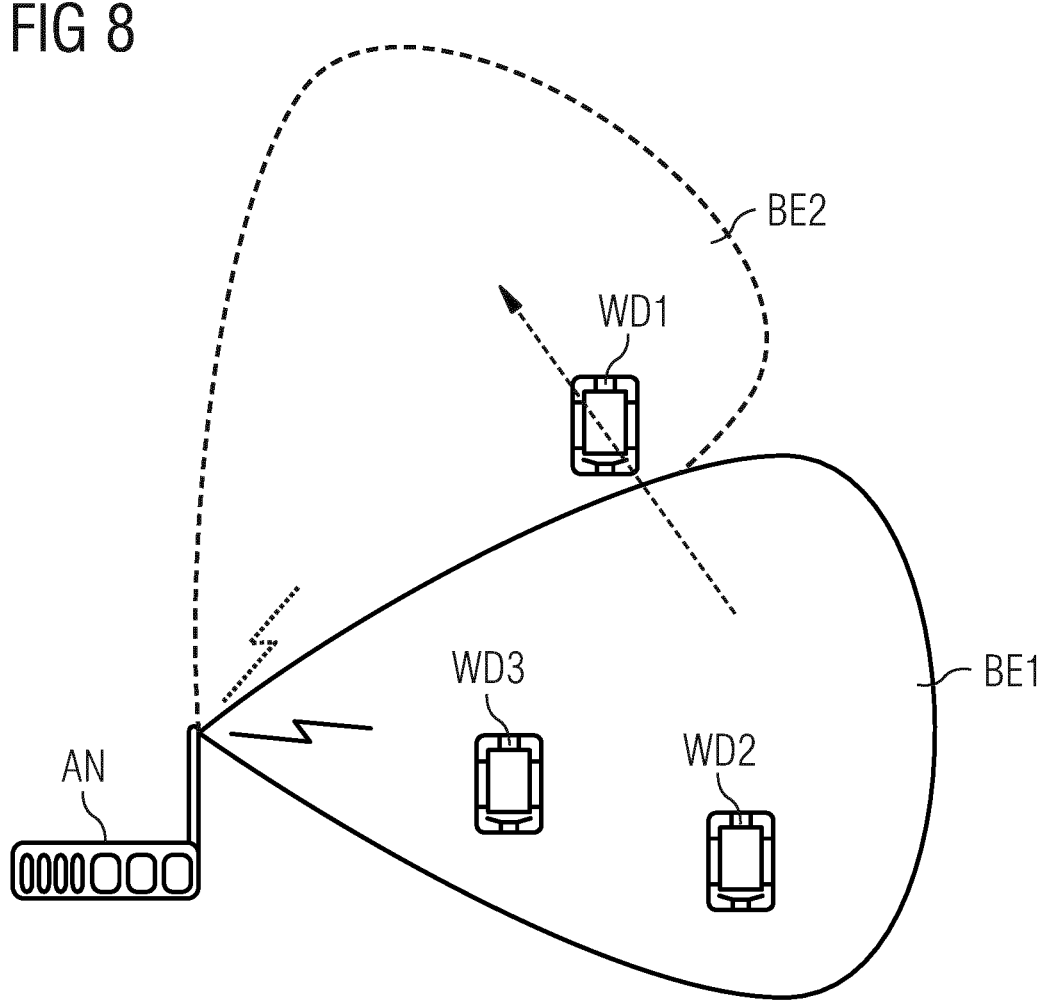
FIG. 8 illustrates an additional beam for supporting a wireless communication device.

Now referring to FIG. 8, the activation of a beam BE2, e.g. based on an indication that another beam BE1 with poor reception already exists for the wireless communication device will be discussed. FIG. 8 illustrates a wireless communication device on its way out of the coverage area of a beam BE1 and the wireless communication device may report the worsened reception to the access node, AN, which triggers the AN to activate a new beam BE2 to support the wireless communication device WD1.

The activation of the beam BE2 based on a request of the wireless communication device WD1 for activation of the beam BE2 may be realized by designing a scheme by which a wireless communication device could request activation of a beam.

The access node AN may allocate different reference signals, RS, to be used in the different beams BE1 and BE2. As mentioned above, the RS may be any kind of signal supporting different function for a wireless communication device, such as a TSS or MRS.

As noted above, the first RS and the second RS are different signals, e.g. two different MRSs, wherein a MRS may be a sequence (or a combination of two or more sequences) of bits or waveforms. These sequences should have suitable autocorrelation and cross-correlation properties. One example of a sequence is a Zadoff-Chu sequence, another one is a differential-coded Golay sequence. The MRSs may be formed by the same type of sequence, but the actual sequence differs between different MRSs. For example one MRS comprises a first set of Zadoff-Chu sequences, and the other (different) MRS comprises a second set of Zadoff-Chu sequences. Accordingly, the two RSs have different identities or characters and thus can be easily distinguished by the receiving wireless communication device(s). In the same or similar way, other RSs can at least be distinguished by their different identities or characters.

In order to avoid a conflict of reference signals, that is to say, in order to avoid that the same (or non-orthogonal) reference signals are used for the first and the second beam BE1, BE2 the access node AN may allocate MRSs within the access node. The access node AN may choose a first MRS for BE1. Subsequently the access node AN may choose a second MRS for the BE2. Both the first and the second MRS may be chosen from a list of available MRS. For choosing the second MRS the access node may not be allowed to choose the same MRS as for BE1, that is, the first MRS is excluded from the MRS eligible for the second beam BE2.

A conflict may thus arise when two neighbor nodes (e.g. candidate and source node) and/or beams (controlled by the respective nodes) use the same non-orthogonal reference signal, e.g. in an overlapping fashion.

It is to be understood that the first beam BE1 may be controlled by a first access node and the second beam may be controlled by a second access node. In that case the first access node corresponds to the source node and the second access node corresponds to the candidate node. The source node would then select a first RS and subsequently the second access node would choose a second RS. Both the first and the second RS may be chosen from a list of available MRS. For choosing the second RS the second access node may not be allowed to choose the same RS as for BE1, that is, the first RS is excluded from the RS eligible for the second beam BE2. Corresponding information may be signaled to from the first access node to the second access node.

Figure 9:
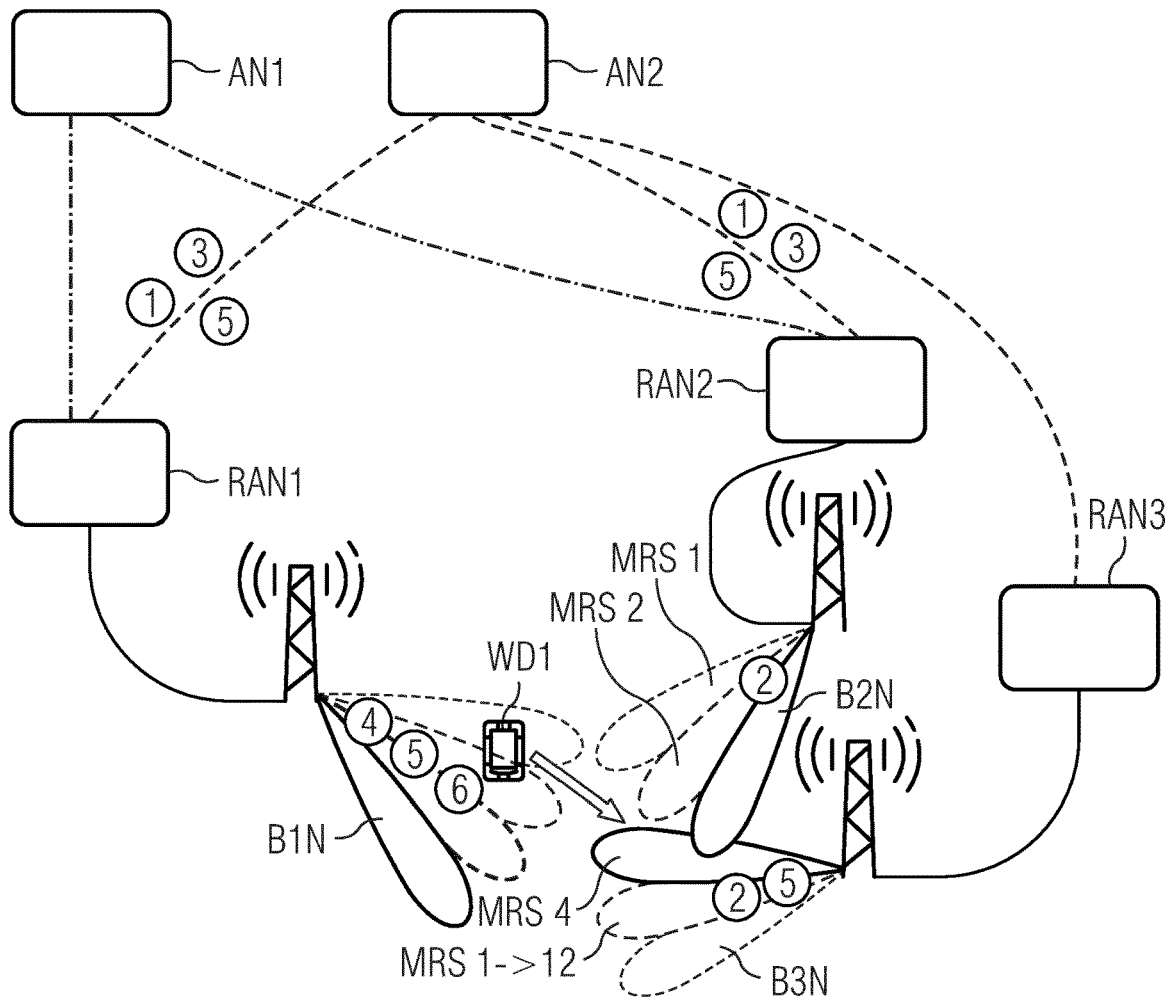
FIG. 9 illustrates allocating reference signals between different access nodes.

Now turning to FIG. 9, a wireless communication device WD1 may move out of the coverage area of one or more beams B1N controlled by a first access node RAN1 and may move into the coverage area of one or more beams B2N, B3N controlled by a second and/or a third access node RAN2, RAN3 respectively.

Although by way of example the one or more beams B1N are controlled by the access node RAN1 and the one or more beams B2N are controlled by the access node B2N, control of the one or more beams B1N and/or B2N may be performed in addition to that in conjunction with network node AN1. Alternatively the control of the beams B1N and/or B2N may lie exclusively with the network node AN1 (which in turn may control the access nodes RAN1 and/or RAN2). The same may be the case with respect to the access node RAN3 and the network node AN2.

Thus it is to be understood that any one of the access nodes and/or the network nodes may serve as a source node and that any other one of the access nodes and/or network nodes may serve as a candidate node.

In the situation mentioned above, when the wireless communication device WD1 moves out of the coverage of one or more beams B1N, the need for mobility actions, such as handover between the first and the second and/or third access node respectively, may arise. This may be determined by the first access node RAN1. The mobility action may require measurements of reference signals by the wireless communication device WD1. These reference signals may be transmitted via beams B1N, B2N and/or B3N controlled by different the access nodes, e.g. access node RAN1, RAN2, RAN3. The first access node may thus identify candidate beams controlled by the neighboring nodes RAN2, RAN3. In that case the first access node RAN1 serves as a source node.

The source node may initially allocate (within the source node) one or more reference signals for the one or more source beams and the one or more candidate beams (neighboring the one or more source beams). The source node may then request reference signal allocation from one or more nodes controlling the one or more candidate beams. The request may include a list of already activated reference signals that the candidate node(s) shall not use for allocation of reference signals. Additionally or alternatively the list may include a list of reference signals the candidate node(s) shall use for allocation of reference signals. The list may either explicitly state the reference signals and/or may include a code identifying one or more reference signals (or one or more groups of reference signals).

The list is thus sent from the source node to the candidate node in case the candidate beam is controlled by a different node than the node that controls the source beam. The activated reference signal(s) of the source beam(s) may be included in the signaling. Indeed, the signaling may not be in form of a list but may signaled in any other way, e.g. the one or more eligible reference signal are sent one at a time. This is depicted by an encircled 1 in FIG. 9.

The one or more candidate nodes may select and even already activate one or more reference signals for the one or more candidate beams, i.e. excluding the reference signals in the received list. The reference signals to be used by the one or more source beams and the one or more candidate beams may thereby be initially allocated. This is depicted by an encircled 2 in FIG. 9.

The candidate beams may subsequently update its neighbor list of activated reference signals by considering the reference signal(s) of the one or more source beams and may—if applicable—identify that there is a conflict in the candidate beam.

Thus the procedure for initially allocating one or more reference signals may include:
  i) The source node allocating one or more reference signals for one or more source beams and candidate beams within the source node. The source node may then assemble a list of already activated reference signals that the source node knows about (for example already activated in source beam and further neighbor beams).
  ii) The source node may request (in parallel) one or more candidate nodes controlling one or more candidate beams, to randomly allocate reference signals, preferably excluding one or more reference signals received from the source node (which have been reserved as they are e.g. already in use).
  iii) The source node may request each candidate node (one by one) controlling candidate beams, to randomly allocate one or more reference signals, to minimize the risk of reference signal conflict (between any of the most probable candidate beams), the random allocation may however exclude the list of reserved reference signals received from the source node. The list of reserved reference signals may be supplemented and extended by the allocated reference signals from the response from each neighbor node, before the list is sent or forwarded to a further neighbor node. The candidate beams can be processed in a prioritized order. The request may control if a target node allocates reference signals to all the candidate beams it controls, or only allocates reference signals to the most prioritized candidate beams as listed in the request. Beams may be prioritized based on the probability that the wireless communication device will report the candidate beam as strongest beam, which may be estimated using historic measurements, such as, number of times wireless communication devices have reported the candidate beam as strongest in the past.
  iv) The source node may divide the available reference signal range ("reference signal space") into one unique portion for each candidate beam or candidate node. Each portion is sent to the candidate node with the order to allocate an reference signals per beam. Each candidate selects a reference signals within the given portion and replies to the source node. The size of the reference signal range allocated to each candidate beam may be based on candidate beam prioritization (see above) and the larger the priority is of a candidate beam, the larger portion of the reference signal range will that beam receive.

The above steps ii), iii), iv) for initial allocation may be performed alternatively and are depicted by an encircled 1 in FIG. 9. In any of those steps the source node may "reserve" or "keep" reference signals that shall not be used by the one or more candidate nodes. This reserved reference signal space may be used by the source node in case it is needed to select a new reference signal due to a reference signal conflict.

The one or more candidate nodes may reply to the source node (after receiving information about at least one reference signal allocated for transmission in at least one beam controlled by the source node and/or information about one or more reference signals eligible to be allocated for a transmission in at least one beam controlled by the candidate node) and may include an indication about a potential conflict of reference signals. This is depicted by an encircled 3 in FIG. 9. The indication may include a value of an estimated "cost" (or disturbance), if the selected reference signal needs to be changed into another one, because of a reference signal conflict e.g. in the source node. The "cost" determination can e.g. be based on the remaining number of reference signals available (i.e. that is possible to select from) or be based on whether the reference signal is used for one or more ongoing mobility procedures. This "cost" may be sent between nodes in case of inter-node mobility.

The source node may subsequently perform conflict detection to determine the probability of a conflict, e.g. whether the probability of a conflict is high or low. This is depicted by an encircled 4 in FIG. 9. Conflict detection may comprise that when the source node has received replies from the candidate nodes for all or at least part of the candidate beams, the source node searches the list for any conflicting reference signal among the already allocated reference signals. Any identified conflicts are determined to give high or low probability of conflict. Probability of conflict may be determined using historic measurements, such as number of times one or more wireless communication devices, e.g. UEs, have reported a candidate beam as strongest beam in the past.

Reference signal collision control may include that the source node (together with one or more nodes controlling conflicting beams) performs reference signal conflict resolution algorithm trying to resolve conflict, e.g. if the probability of a conflict is above a certain threshold. This is depicted by an encircled 5 and an encircled 6 in FIG. 9. Thus, for example if the probability exceeds said threshold the source node performs reference signal conflict handling in order to "live with the conflict" and the procedure ends. If the probability does not exceed said threshold nothing has to be done.

The procedure for conflict resolution may comprise the following steps:
i) The candidate node may select conflicting beams and request a new allocation of reference signals for one or more of the conflicting beams, e.g. by re-configuring reference signals and its wireless communication device—if necessary). The new allocation can follow the procedure in accordance to steps and alternatives for the initial reference signal allocation as described through the disclosure.
ii) The candidate node may be ordered to de-allocate one or more reference signals, leaving for example only one beam using a reference signal. This may be experience based, e.g. between different beams.
iii) The candidate node may be ordered to allocate reference signals in an extended reference signal space and then re-configure one or more wireless communication devices if needed. The reference signal space may be extended compared to the reference signal space given to the candidate node the first time, by for example using reference signals earlier offered, but not used, to other beams or nodes or by using reference signals from a reserved space, not offered to any beam or node the first time.

The above steps i), ii), iii) for conflict resolution may be performed alternatively. The estimated "cost", received for the candidate beams, can be used to select what candidate beam in conflict to order to resolve the conflict.

Furthermore, in case not all conflicts can be resolved and/or in case a wireless communication device reports a reference signal which is in conflict, a procedure for reference signals conflict handling may be performed comprising the following steps:
i) the node receiving the report can skip the report,
ii) the wireless communication device may be ordered to perform additional measurements to uniquely identify the reported beam the reference signal is connected to,
iii) the node receiving the report may issue a mobility action towards the reported reference signal and afterwards determine whether the mobility action was successful or not. The success rate can further on determine the most probable relation between reference signal and actual beam,
iv) the source node can prepare multiple candidate beams (nodes) for HO. Once the UE has performed random access, the target node may initiate continuation of the handover procedure.

A (measurement) report comprising information about a conflict of reference signals received by the wireless communication device may comprise information about what reference signal(s) has been found and what radio quality has been measured on this reference signal(s). This could e.g. be in the form of a list of the found reference signals.

The procedure for allocating reference signals will now be described with reference to the sequence diagram of FIG. 10.

In a step S0 initial allocation of one or more first reference signal(s) in the source node SN takes place. The allocation may refer to one or more beams controlled by the source node. Additionally step S0 may include allocating one or more second reference signal(s) for beams neighboring the beams controlled by the source node, that is to say one or more reference signals may be allocated to be used by a candidate node.

In a step S1 the source node may transmit to a candidate node information about at least one reference signal allocated for transmission in at least one beam controlled by the source node and/or information about one or more reference signals eligible to be allocated for a transmission in at least one beam controlled by the candidate node. For example the transmission may take the form of a request. That is, the source node may request reference signal allocation from one or more nodes controlling candidate beams. The request may include a list of one or more already activated reference signals that the candidate nodes shall not use for this allocation. The list is sent between source node and candidate node in case the candidate beam is in a different node than the source beam. The activated reference signal of the source beam may thus be included in the signaling. The information about at least one reference signal allocated for transmission in at least one beam controlled by the source node and/or information about one or more reference signals eligible to be allocated for a transmission in at least one beam controlled by one or more candidate nodes may be transmitted to more than one candidate node as illustrated in FIG. 10. For example, such information may be transmitted to a first candidate node CN and/or a second candidate node CN'. Either the source node may send the information directly to the candidate node CN' or via the candidate node CN.

In a step S2 (S2') the candidate node CN (CN') may select and activate one or more reference symbols for the candidate beams, e.g. by excluding the one or more reference signals in the received list. Optionally the candidate node CN (CN') updates its neighbor list of activated reference signals with the reference signal of the source beam(s) and may preferably as the case may be identify that there is a conflict in the candidate beam.

In a step S3 the candidate node(s) CN (CN') may reply to the source node's request and may include a value of the estimated "cost" (or disturbance), if later having to change the selected reference signal into another one, because of a reference signal conflict with the source node. The cost can e.g. be based on the remaining reference signal space that is possible to select from or if the reference signal is used for one or more ongoing mobility procedures. The cost is sent between nodes in case of inter-node mobility. Additionally or alternatively the candidate node(s) may inform the source node about the one or more reference signals selected by the candidate node(s).

In a step S4 the source node may perform conflict detection to determine whether probability for conflict is high or low. This may be based on the reference signals selected by the candidate node(s) and/or the ("cost") value received from the candidate node(s). The source node may perform conflict detection with respect to reference signals allocated by the source node and/or the allocated by the candidate node(s). For example if the probability of a conflict is low nothing has to be done. However, if the probability of a conflict is high (e.g. exceeds a certain threshold): the source node may (together with conflicting beams) perform a reference signal conflict resolution algorithm trying to resolve conflict.

In a step S5 the source node may request new allocation for one or more of the conflicting beams by the candidate node(s). This step may include a procedure for reference signal conflict handling (cf. "conflict handling" above).

In a step S5 the candidate node(s) may thus reselect or reallocate the reference signals previously selected.

Figure 11:
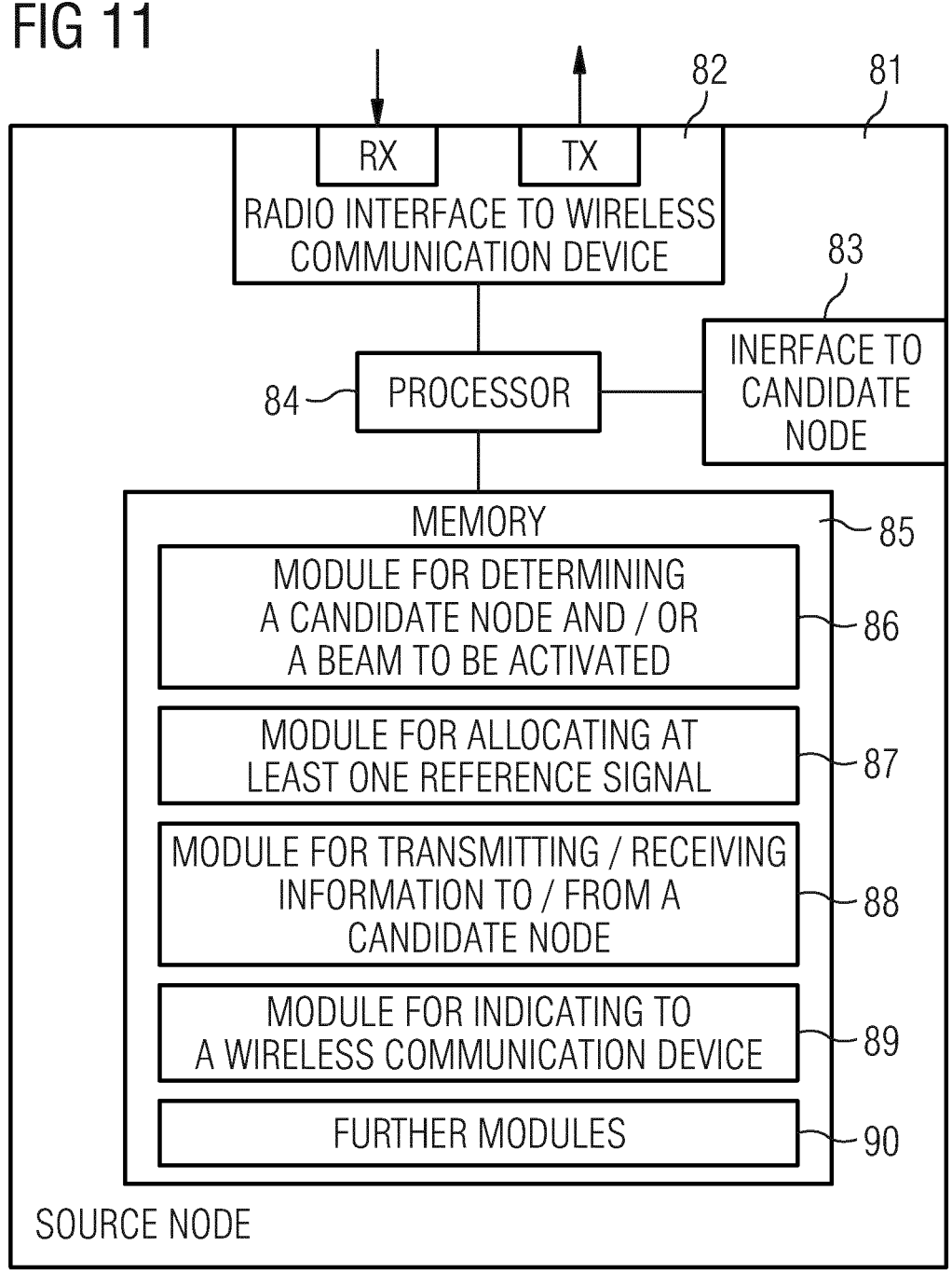
FIG. 11 schematically illustrates exemplary structures of a first access node.

FIG. 11 illustrates exemplary structures which may be used for implementing the above concepts in a source node 81 of a wireless communication network, such as any one of the access nodes AN, AN1, AN2, RAN1, RAN2, RAN3.

As illustrated, the source node 81 may include a radio interface 82 for sending radio transmissions to one or more wireless communication devices and/or receiving radio transmissions from one or more wireless communication devices. Such one or more wireless communication devices may for example correspond to the above-mentioned one or more wireless communication devices WD, WD1, WD2, WD3. Further, the source node 81 may include a network interface 83 for connecting to a core network part of the wireless communication network and/or to other access nodes of the wireless communication network such as e.g. one or more candidate node(s).

Further, the source node 81 may include one or more processors 84 coupled to the interfaces 82, 83, and a memory 85 coupled to the processor(s) 84. The memory 85 may include a ROM, e.g., a flash ROM, a Random Access Memory (RAM), e.g., a Dynamic RAM (DRAM) or Static RAM (SRAM), a mass storage, e.g., a hard disk or solid state disk, or the like. The memory 85 includes suitably configured program code to be executed by the processor(s) 84 so as to implement the above-described functionalities of an source node. In particular, the memory 85 may include various program code modules for causing the access node 900 to perform processes as described above, e.g., corresponding to the method steps of FIG. 10.

As illustrated, the memory 85 may include a module 86 for determining a candidate node and/or a beam to be activated. The beam to be activated may either be one or more beams controlled by the source node and/or one or more beams to be activated which are controlled by the candidate node.

Further, the memory 85 may include a module 84 for allocating at least one reference signal. The one or more reference signals may be selected from a set of available reference signals, for transmission in at least one beam controlled by the source node and/or for transmission in at least one beam controlled by the candidate node.

Further, the memory 85 may also include a module 88 for transmitting and/or receiving information to or from a candidate node respectively. The module may comprise: Transmitting to a candidate node information about at least one reference signal allocated for transmission in at least one beam controlled by the source node and/or information about one or more reference signals eligible to be allocated for a transmission in at least one beam controlled by the candidate node Further, the memory 85 may include a module 89 for indicating to a wireless communication device to measure and/or report a radio link quality of the at least one beam controlled by the source node and/or the at least one beam controlled by the candidate node.

The indication may be a measurement configuration including a list of one or more reference signals, e.g. MRSs, for the wireless communication device, e.g. a UE, to start measuring on. The list could be optional, e.g. activated in case necessary, and be pre-configured, e.g. include a predetermined list of reference signals.

Furthermore, the memory 85 may include further modules 90 for carrying out any one of the aforementioned steps such as: Determining a demand for a reference signal to be allocated for transmission in at least one beam controlled by the source node and/or in at least one beam controlled by the candidate node; Activating transmission of the reference signal in the at least one beam controlled by the source node and/or initiating transmission of the references signal in the at least one beam controlled by the candidate node; Transmitting said reference signals in the at least one beam controlled by the source node and/or initiating transmission in the at least one beam controlled by the candidate node for a predetermined period of time or until a report from a wireless communication device has been received, the report comprising information about the radio link quality of the at least one beam controlled by the source node and/or the candidate node; Receiving from the candidate node information about the reference symbol allocated for the at least one beam controlled by the candidate node; Determining a conflict between the reference signal allocated by the source node and the reference signal allocated by the candidate node, e.g. based on a probability associated with the respective reference signals and/or the information about the references signal controlled by the source node and/or the reference signal controlled by the candidate node; Re-allocating the reference signal for transmission in a beam controlled by the source node and/or re-allocating the reference signal for transmission in a beam controlled by the candidate node in case a conflict has been determined; Receiving a report from a wireless communication device, the report comprising information about a conflict of reference signals received by the wireless communication device.

The information about the at least one reference signal allocated for transmission in the at least one beam controlled by the source node may comprise information indicative of at least one of the following: a reference symbol, time and/or frequency resources for transmission of the reference symbol in the at least one beam controlled by the source node.

The information about one or more reference signals eligible to be allocated for a transmission in at least one beam controlled by the candidate node may comprise information indicative of at least one of the following: a reference symbol, time and/or frequency resources for transmission of the reference symbol in the at least one beam controlled by the candidate node.

It is to be understood that the structures as illustrated in FIG. 11 are merely schematic and that the source node 81 may actually include further components which, for the sake of clarity, have not been illustrated, e.g., further interfaces or processors. Also, it is to be understood that the memory 85 may include further types of program code modules, which have not been illustrated, e.g., program code modules for implementing known functionalities of an access node, such as an eNB of the LTE radio technology. According to some embodiments, also a computer program may be provided for implementing functionalities of the source node 85, e.g., in the form of a physical medium storing the program code and/or other data to be stored in the memory 85 or by making the program code available for download or by streaming.

Figure 12:
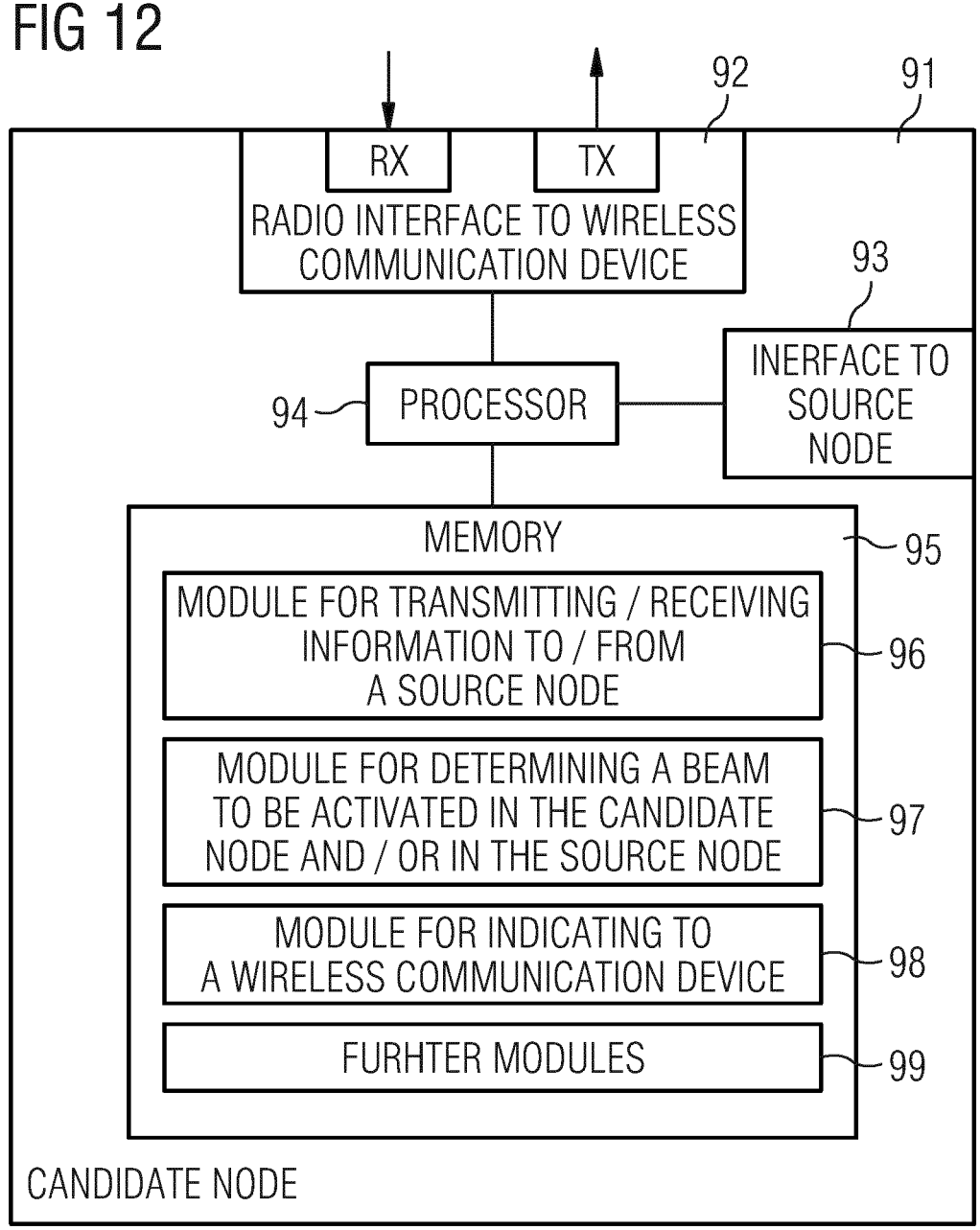
FIG. 12 schematically illustrates exemplary structures of a second access node.

FIG. 12 illustrates exemplary structures which may be used for implementing the above concepts in a candidate node 91 of a wireless communication network, such as any one of the access nodes AN, AN1, AN2, RAN1, RAN2, RAN3.

As illustrated, the candidate node 91 may include a radio interface 92 for sending radio transmissions to radio devices and/or receiving radio transmissions from one or more wireless communication devices. Such wireless communication devices may for example correspond to the above-mentioned radio devices WD, WD1, WD2, WD3. Further, the candidate node 91 may include a network interface 93 for connecting to a core network part of the wireless communication network and/or to a candidate node of the wireless communication network.

Further, the candidate node 91 may include one or more processors 94 coupled to the interfaces 92, 93, and a memory 95 coupled to the processor(s) 94. The memory 95 may include a ROM, e.g., a flash ROM, a Random Access Memory (RAM), e.g., a Dynamic RAM (DRAM) or Static RAM (SRAM), a mass storage, e.g., a hard disk or solid state disk, or the like. The memory 960 includes suitably configured program code to be executed by the processor(s) 94 so as to implement the above-described functionalities of an access node. In particular, the memory 95 may include various program code modules for causing the candidate node 91 to perform processes as described above.

As illustrated, the memory 95 may include a module 96 for transmitting and/or receiving information to and/or from a source node respectively. The module may comprise functionalities like: Receiving from a source node information about at least one reference signal allocated for transmission in at least one beam controlled by the source node and/or information about one or more reference signals eligible to be allocated for a transmission in at least one beam controlled by the candidate node.

Further, the memory 95 may include a module 97 for determining a beam to be activated in the candidate node and/or determining a beam to be activated in the source node.

Further, the memory 95 may include a module 98 for indicating to a wireless communication device, e.g. to measure and/or report a radio link quality of the at least one beam controlled by the source node and/or the at least one beam controlled by the candidate node.

Furthermore, the memory 95 may include further modules for performing any one of the steps of: Allocating at least one reference signal, preferably from a set of available reference signals, for transmission in at least one beam controlled by the candidate node; Determining a demand for a reference signal to be allocated for transmission in at least one beam controlled by the source node and/or in at least one beam controlled by the candidate node; Activating transmission of the reference signal in the at least one beam controlled by the candidate node and/or initiating transmission of the references signal in the at least one beam controlled by the source node; Transmitting said reference signals in the at least one beam controlled by the candidate node and/or initiating transmission in the at least one beam controlled by the source node for a predetermined period of time or until a report from a wireless communication device has been received, the report comprising information about the radio link quality of the at least one beam controlled by the source node and/or the candidate node; Transmitting from the candidate node information about the reference symbol allocated for the at least one beam controlled by the candidate node; Determining a conflict between the reference signal allocated by the source node and the reference signal allocated by the candidate node, e.g. based on a probability associated with the respective reference signals and/or the information about the references signal controlled by the source node and/or the reference signal controlled by the candidate node; Re-allocating the reference signal for transmission in a beam controlled by the source node and/or re-allocating the reference signal for transmission in a beam controlled by the candidate node in case a conflict has been determined; Receiving a report from a wireless communication device, the report comprising information about a conflict of reference signals received by the wireless communication device;

The information about the at least one reference signal allocated for transmission in the at least one beam controlled by the source node may comprise information indicative of at least one of the following: a reference symbol, time and/or frequency resources for transmission of the reference symbol in the at least one beam controlled by the source node.

The information about one or more reference signals eligible to be allocated for a transmission in at least one beam controlled by the candidate node may comprise information indicative of at least one of the following: a reference symbol, time and/or frequency resources for transmission of the reference symbol in the at least one beam controlled by the candidate node It is to be understood that the structures as illustrated in FIG. 9 are merely schematic and that the access node 900 may actually include further components which, for the sake of clarity, have not been illustrated, e.g., further interfaces or processors. Also, it is to be understood that the memory 960 may include further types of program code modules, which have not been illustrated, e.g., program code modules for implementing known functionalities of an access node, such as an eNB of the LTE radio technology. According to some embodiments, also a computer program may be provided for implementing functionalities of the access node 900, e.g., in the form of a physical medium storing the program code and/or other data to be stored in the memory 960 or by making the program code available for download or by streaming.

Figure 10:
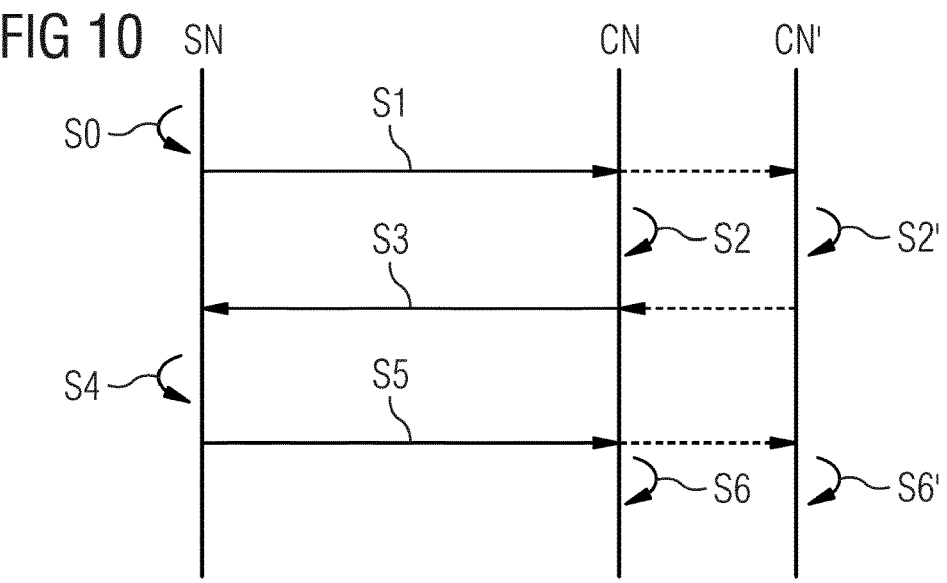
FIG. 10 shows a sequence diagram illustrating the concept of allocating reference signals.

FIG. 10 illustrates exemplary structures which may be used for implementing the above concepts in a wireless communication device 11, such as any one of the wireless communication devices WD, WD1, WD2, WD3. The wireless communication device 11 may for example correspond to a mobile phone or to some other type of portable or stationary computing device. Further, the radio device 11 may also correspond to an MTC device, e.g., a sensor or actuator.

As illustrated, the wireless communication device 11 may include a radio interface 12 for connecting the wireless communication device 11 to the wireless communication network. Further, the wireless communication device 11 may include one or more processors 13 coupled to the interface 12, and a memory 17 coupled to the processor(s) 13. The memory 17 may include a ROM, e.g., a flash ROM, a RAM, e.g., a DRAM or SRAM, a mass storage, e.g., a hard disk or solid state disk, or the like. The memory 17 includes suitably configured program code to be executed by the processor(s) 13 so as to implement the above-described functionalities of a wireless communication device. In particular, the memory 17 may include various program code modules for causing the wireless communication device 11 to perform processes as described above.

As illustrated, the memory 17 may include a module 15 for receiving a reference signal and/or an indication from a source node. Further, the memory 17 may include a module 14 for receiving a reference signal and/or an indication from a candidate node. The reference signals may be the reference signals described in the above which have been allocated, e.g. for reference signal conflict avoidance, and subsequently are transmitted from the source node and the candidate node respectively. Similarly an indication from the candidate and/or the source node may be received by the wireless communication device. The indication indicating to a wireless communication device to measure and/or report a radio link quality of the at least one beam controlled by the source node and/or the at least one beam controlled by the candidate node.

Thus the memory 17 may include a module 16 for measuring and/or reporting a radio link quality of the at least one beam controlled by the source node and/or the at least one beam controlled by the candidate node.

The radio link quality may be obtained by calculating an error rate of a radio channel, such as the at least one beam controlled by the source node and/or the at least one beam controlled by the candidate node. Alternatively, the error rate and thus the radio link quality may be predicted based on the signal-to-noise ratio (SNR) of the radio channel. Furthermore, during radio link monitoring, the physical layer may indicate an out-of-sync/in-sync status to higher layers. The wireless communication device is out-of-sync when the radio quality is worse than a threshold value. The wireless communication device is in-sync when the radio link quality is better than a threshold value.

Figure 13:
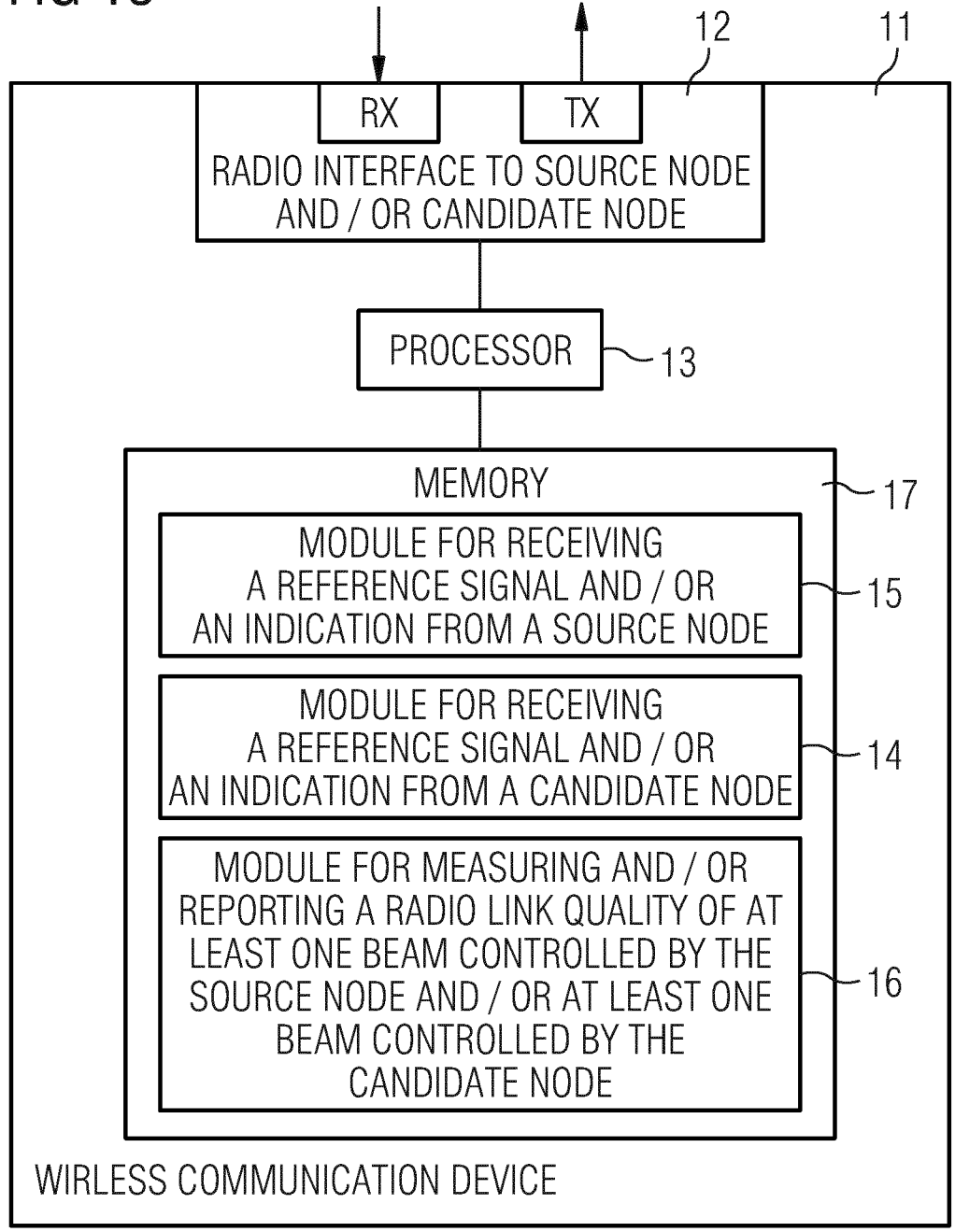
FIG. 13 schematically illustrates exemplary structures of a wireless communication device.

It is to be understood that the structures as illustrated in FIG. 13 are merely schematic and that the wireless communication device 11 may actually include further components which, for the sake of clarity, have not been illustrated, e.g., further interfaces or processors. Also, it is to be understood that the memory 17 may include further types of program code modules, which have not been illustrated, e.g., program code modules for implementing known functionalities of a wireless communication device as specified for the LTE radio technology. According to some embodiments, also a computer program may be provided for implementing functionalities of the wireless communication device 11, e.g., in the form of a physical medium storing the program code and/or other data to be stored in the memory 17 or by making the program code available for download or by streaming.

It is to be understood that the abovementioned method steps, devices and modules may be employed for the purpose of a handover between a source node and a candidate node, for selecting, aggregating and/or adding a component carrier, for balancing traffic load between at least two component carriers.

As can be seen, the concepts as described above may be used for efficiently controlling radio transmissions in a wireless communication network. In particular, the concepts may be applied for considering coexistence of radio devices and/or applications which are subject to different timing requirements.

It is to be understood that the examples and embodiments as explained above are merely illustrative and susceptible to various modifications. For example, the illustrated concepts may be applied in connection with various radio technologies, without limitation to the above-mentioned example of a the LTE radio technology or a 5G radio technology. Further, the illustrated concepts may be applied in connection with various kinds of access nodes and radio devices. Further, the concepts may be applied with respect to any number of different timing requirements and corresponding search space configurations. Moreover, it is to be understood that the above concepts may be implemented by using correspondingly designed software to be executed by one or more processors of an existing device, or by using dedicated device hardware. Further, it should be noted that the illustrated nodes may each be implemented as a single device or as a system of multiple interacting devices.

The invention claimed is:

1. A method, in a source access node of a radio network, of allocating reference signals for determining radio link quality, the method comprising:

identifying one or more candidate beams that are candidates for serving a wireless communication device that is served by a serving beam of the source access node;

identifying non-conflicting subsets of reference signals, from a defined set of reference signals, wherein each subset corresponds to a respective candidate beam and the subsets are non-conflicting with respect to each other and with respect to one or more reference signals allocated at the serving access node for reference-signal transmission in the serving beam;

transmitting one or more requests for one or more candidate access nodes that control the one or more candidate beams, the one or more requests indicating the non-conflicting subsets of reference signals as being eligible for allocation for reference-signal transmission in the respective candidate beams;

receiving one or more responses from the one or more candidate access nodes, the one or more responses indicating the reference-signal allocations made by the one or more candidate access nodes for reference-signal transmissions in the one or more candidate beams; and transmitting signaling to the wireless communication device, instructing the wireless communication device to measure and report radio link quality with respect to the one or more candidate beams, according to the reference-signal allocations.

2. The method according to claim 1, wherein identifying the one or more subsets comprises identifying respective subsets according to a prioritization of the one or more candidate beams, such that at least one of the following applies: the subset for a higher-priority beam is identified before the subset for a lower-priority beam, or the subset for a higher-priority beam includes more reference signals than the subset for a lower-priority beam.

3. The method according to claim 1, further comprising, responsive to receiving an indication of a reference-signal conflict with respect to a particular one of the candidate beams, adjusting one or more of the remaining subsets to avoid conflicts with a reference-signal allocation that was made at the candidate node for the particular candidate beam to avoid the reference-signal conflict.

4. The method according to claim 1, wherein the non-conflicting subsets of reference signals are eligible for allocation for a limited time.

5. The method according to claim 1, wherein the one or more requests indicate time/frequency resources to be used for reference-signal transmission in the one or more candidate beams.

6. The method according to claim 5, further comprising indicating the time/frequency resources to the wireless communication device.

7. A source access node configured for operation in a radio network, including, allocating reference signals for determining radio link quality, the source access node comprising:

processing circuitry; and a memory storing computer instructions that, when executed by the processing circuitry, configures the source access node to:

identify one or more candidate beams that are candidates for serving a wireless communication device that is served by a serving beam of the source access node;

identify non-conflicting subsets of reference signals, from a defined set of reference signals, wherein each subset corresponds to a respective candidate beam and the subsets are non-conflicting with respect to each other and with respect to one or more reference signals allocated at the serving access node for reference-signal transmission in the serving beam;

transmit one or more requests for one or more candidate access nodes that control the one or more candidate beams, the one or more requests indicating the non-conflicting subsets of reference signals as being eligible for allocation for reference-signal transmission in the respective candidate beams;

receive one or more responses from the one or more candidate access nodes, the one or more responses indicating the reference-signal allocations made by the one or more candidate access nodes for reference-signal transmissions in the one or more candidate beams; and transmit signaling to the wireless communication device, instructing the wireless communication device to measure and report radio link quality with respect to the one or more candidate beams, according to the reference-signal allocations.

* * * * *